United States Patent [19]

Gregory et al.

[11] Patent Number: 5,268,459
[45] Date of Patent: Dec. 7, 1993

[54] AZO DYES SUITABLE FOR INK JET PRINTING

[75] Inventors: Peter Gregory, Bolton; Ronald W. Kenyon, Failsworth, both of England

[73] Assignee: Imperial Chemical Industries plc, London, England

[21] Appl. No.: 723,323

[22] Filed: Jun. 28, 1991

[30] Foreign Application Priority Data

Jul. 26, 1990 [GB] United Kingdom ............... 9016448

[51] Int. Cl.$^5$ .................... C09B 62/09; C09B 35/26; C09B 33/12; C09D 11/02
[52] U.S. Cl. .................... 534/758; 534/637; 534/664; 534/665; 534/670; 534/672; 534/673; 534/797; 534/817; 534/818; 106/22 K; 106/20 D
[58] Field of Search ............... 534/637, 664, 665, 667, 534/672, 758, 797, 817

[56] References Cited

U.S. PATENT DOCUMENTS

| | | | |
|---|---|---|---|
| 1,594,828 | 8/1926 | Geller | 534/672 |
| 1,808,849 | 6/1931 | Heintrich et al. | 534/664 |
| 1,845,426 | 2/1932 | Laten | 534/665 X |
| 2,696,486 | 12/1954 | Gunst | 534/664 |
| 2,777,840 | 1/1957 | Liechti et al. | 534/672 |
| 3,945,990 | 3/1976 | Ikeda et al. | 534/797 |
| 4,474,696 | 10/1984 | Takahashi et al. | 534/634 |
| 4,605,442 | 8/1986 | Kawashita et al. | 534/797 X |
| 4,661,158 | 4/1987 | Kobayashi et al. | 534/797 X |
| 4,843,150 | 6/1989 | Hihara et al. | 534/634 |
| 4,997,919 | 3/1991 | Schaulin | 534/797 X |

FOREIGN PATENT DOCUMENTS

2555533 7/1976 Fed. Rep. of Germany ...... 534/797

Primary Examiner—Mary C. Lee
Assistant Examiner—Fiona T. Powers
Attorney, Agent, or Firm—Cushman, Darby & Cushman

[57] ABSTRACT

Anionic azo compounds which, in the free acid form, have the Formula (1):

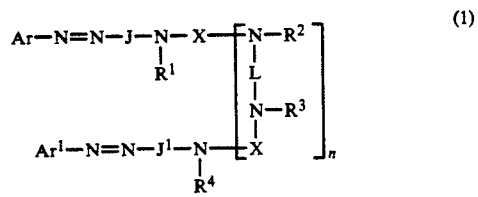

wherein:

Ar and $Ar^1$ are each independently aryl or substituted aryl providing at least one of Ar and $Ar^1$ has at least one substituent selected from COOH and COSH;

J and $J^1$ are each independently of formula (2), (3) or (4):

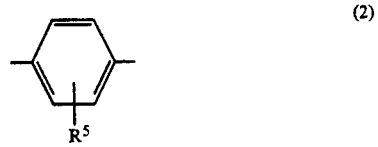

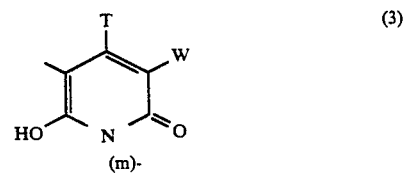

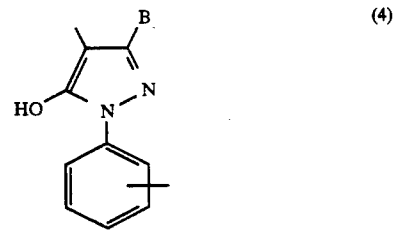

each $R^5$ is independently selected from H, alkyl, substituted alkyl, alkoxy, halogen, CN, ureido and $NHCOR^6$;

$R^6$ is H, alkyl, substituted alkyl, aryl, substituted aryl, aralkyl or substituted aralkyl;

(Abstract continued on next page.)

each T is independently alkyl;

each W is independently selected from H, CN, CONR$^{10}$R$^{11}$, pyridinium and COOH;

each m is an alkylene chain having 2 to 8 carbon atoms;

B is H, alkyl or COOH;

R$^1$, R$^2$, R$^3$, R$^4$, R$^{10}$ and R$^{11}$ are each independently H, alkyl or substituted alkyl;

L is a divalent organic linking group;

n is 0 or 1;

each X is independently carbonyl or a group of the Formula (5), (6) or (7):

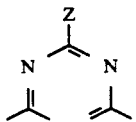  (5)

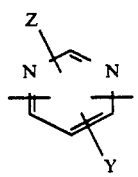  (6)

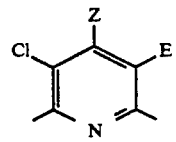  (7)

Z is OR$^7$, SR$^7$ or NR$^8$R$^9$;

Y is H, Cl, CN or Z;

E is Cl or CN;

R$^7$, R$^8$ and R$^9$ are independently H, alkenyl, substituted alkenyl, alkyl, substituted alkyl, aryl, substituted aryl, aralkyl or substituted aralkyl, or R$^8$ and R$^9$ together with the nitrogen atom to which they are attached form a 5 or 6 membered ring;

provided (i) if the compound of Formula (1) has no —SO$_3$H groups then it has at least two groups selected from —COOH and —COSH; and (ii) the compound of Formula (1) has at least as many groups selected from —COOH and —COSH as —SO$_3$H groups.

The compounds are useful for the preparation of inks for use in ink-jet printing.

14 Claims, No Drawings

AZO DYES SUITABLE FOR INK JET PRINTING

This specification describes an invention relating to anionic compounds and particularly to anionic azo compounds which are useful as the coloured component of inks, particularly inks used in ink jet printing.

According to the present invention there are provided anionic azo compounds which, in the free acid form, have the structure shown in Formula (1):

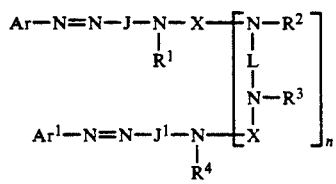

wherein:

Ar and $Ar^1$ are each independently aryl or substituted aryl providing at least one of Ar and $Ar^1$ has at least one substituent selected from COOH and COSH;

J and $J^1$ are each independently of formula (2), (3) or (4):

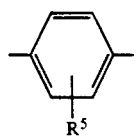

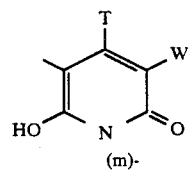

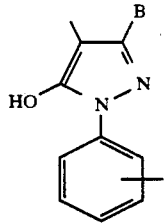

each $R^5$ is independently selected from H, alkyl, substituted alkyl, alkoxy, halogen, CN, ureido and $NHCOR^6$;

$R^6$ is H, alkyl, substituted alkyl, aryl, substituted aryl, aralkyl or substituted aralkyl;

each T is independently alkyl;

each W is independently selected from H, CN, $CONR^{10}R^{11}$, pyridinium and COOH;

each m is an alkylene chain having 2 to 8 carbon atoms;

B is H, alkyl or COOH;

$R^1$, $R^2$, $R^3$, $R^4$, $R^{10}$ and $R^{11}$ are each independently H, alkyl or substituted alkyl;

L is a divalent organic linking group;

n is 0 or 1;

each X is independently carbonyl or a group of the Formula (5), (6) or (7):

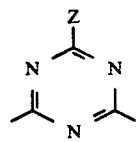

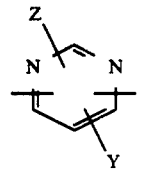

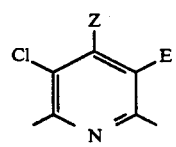

Z is $OR^7$, $SR^7$ or $NR^8R^9$;

Y is H, Cl, CN or Z;

E is Cl or CN;

$R^7$, $R^8$ and $R^9$ are independently H, alkenyl, substituted alkenyl, alkyl, substituted alkyl, aryl, substituted aryl, aralkyl or substituted aralkyl, or $R^8$ and $R^9$ together with the nitrogen atom to which they are attached form a 5 or 6 membered ring;

provided (i) if the compound of Formula (1) has no —$SO_3H$ groups then it has at least two groups selected from —COOH and —COSH; and (ii) the compound of Formula (1) has at least as many groups selected from —COOH and —COSH as —$SO_3H$ groups.

It is preferred that the compound of Formula (1) has at least as many —COOH as —$SO_3H$ groups and if the compound of Formula (1) has no —$SO_3H$ groups then it has at least two and more preferably at least three —COOH groups.

It is preferred that Ar—N=N—J and Ar—N=N—$J^1$ are such that the compounds of Formula (1) are yellow. It is also preferred that compounds of Formula (1) are free from cellulose reactive groups.

The groups Ar and $Ar^1$ are preferably independently selected from naphthyl, substituted naphthyl, phenyl and substituted phenyl, especially phenyl and substituted phenyl. The optional substituents on Ar and $Ar^1$ are preferably selected from alkyl, especially $C_{1-4}$-alkyl; substituted $C_{1-4}$-alkyl; alkoxy, especially $C_{1-4}$-alkoxy; —$SO_3H$; —$PO_3H_2$; —COSH; —OH; —$CO_2H$; halogen, especially Cl or Br. It is particularly preferred that when Ar and $Ar^1$ are substituted the substituents are independently selected from $CO_2H$, COSH and $SO_3H$, especially $CO_2H$. In especially preferred structures, at least one of Ar and $Ar^1$ has at least one —COOH substituent but it is even more preferred that each of Ar and $Ar^1$ has at least one —COOH substituent and more particularly at least two —COOH substituents as in, for example, dicarboxyphenyl.

Each $R^5$ is preferably independently selected from H, $C_{1-4}$-alkyl, substituted $C_{1-4}$-alkyl, $C_{1-4}$-alkoxy, Cl, CN, Br, ureido or $NHCOR^6$, more preferably H, $C_{1-4}$-alkyl, $C_{1-4}$-alkoxy, ureido or $NHCO(C_{1-4}$-alkyl), especially H, methyl, methoxy or ureido. Each $R^5$ is preferably ortho with respect to the azo group connected to the same ring.

$R^6$ is preferably H, $C_{1-4}$-alkyl, phenyl or $(CH_2)_{1-4}$-phenyl, all of which are either unsubstituted or substituted. $R^6$ is more preferably $C_{1-4}$-alkyl.

Each T is preferably independently $C_{1-6}$-alkyl, especially $C_{1-4}$-alkyl.

The group (m) present in Formula (3) is branched chain alkylene or preferably straight chain alkylene.

B is preferably H.

When X is of Formula (6) it is preferred that Z is attached to the carbon atom between the two ring nitrogen atoms and that Y is para with respect to Z. Each X independently is preferably of Formula (5).

Z is preferably $NR^8R^9$, especially $NHC_2H_4OH$, $N(C_2H_4OH)_2$, morpholino, $NH(C_{1-6}$-alkyl), $NH-(CH_2)2-CO_2H$, $NHCH_2C_6H_4CO_2H$, mono- or di-carboxyanilino, $NHC_4H_4SO_3H$ or $NHCH_2SO_3H$.

$R^1$, $R^2$, $R^3$ and $R^4$ are preferably independently selected from H, $C_{1-4}$-alkyl and $C_{1-4}$-alkyl substituted by OH.

$R^7$, $R^8$ and $R^9$ are preferably independently selected from H, $C_{1-6}$-alkyl, substituted $C_{1-6}$-alkyl, $C_{3-4}$-alkenyl, phenyl, substituted phenyl, $(CH_2)_{1-4}$-phenyl, substituted $(CH_2)_{1-4}$-phenyl, more preferably H, allyl, $C_{1-4}$-alkyl, benzyl, hydroxy $C_{1-4}$-alkyl especially H, methyl, ethyl and 2-hydroxyethyl. The optional substituents on $R^7$, $R^8$ and $R^9$ are preferably independently selected from —OH, —$SO_3H$ and —COOH, especially —OH. When $R^8$ and $R^9$ together with the nitrogen atom to which they are attached form a 5 or 6 membered ring they preferably form a morpholine, piperazine or piperidine ring.

The identity of the divalent organic linking group L is not critical providing it does not interfere with the performance of the compound. As examples of divalent organic linking groups represented by L there may be mentioned:

(a) divalent aliphatic radicals, preferably those containing from 2 to 6 carbon atoms, such as ethylene, trimethylene, propylene, tetramethylene, alpha:beta-dimethylethylene and hexamethylene radicals;

(b) divalent aromatic homocyclic radicals in which at least one of the terminal links is through an aliphatic carbon atom, for example as in the benzylene —$C_6H_4.CH_2$— or the xylylene —$CH_2C_6H_4CH_2$— group;

(c) divalent monocyclic or fused polycyclic aromatic radicals, for example of the benzene, naphthalene, anthraquinone or fluorene series, such as

| | |
|---|---|
| 1,3- or 1,4-phenylene | 2-nitro-1,4-phenylene |
| 3-sulpho-1,4-phenylene | 4-methoxy-1,3-phenylene |
| 4-sulpho-1,3-phenylene | 4-nitro-1,3-phenylene |
| 2-carboxy-1,4-phenylene | 2-chloro-1,4-phenylene |
| 4-carboxy-1,3-phenylene | 3,7-disulpho-1,5-naphthylene |
| 2-methoxy-1,4-phenylene; | |

(d) divalent radicals wherein the terminal bonds are attached to carbon atoms of two phenyl or naphthalene nuclei which are joined together either through a direct link or through an atom or chain of atoms which may form a homocyclic or heterocyclic ring. Of this type, there may be mentioned as examples divalent radicals derived from

| | |
|---|---|
| diphenyl | azobenzene |
| diphenyloxide | diphenyloxadiazole |
| diphenylamine | benzanilide |

| | |
|---|---|
| diphenylsulphide | diphenylurea |
| diphenylsulphone | 1,2-bis(phenylcarbamyl)ethylene |
| diphenylmethane | 1,4-bis-(phenylcarbamyl)butadiene |
| diphenylketone | 1,2-bis-(phenylcarbamyl)ethane |
| diphenylethane | 1,3-bis-(phenylcarbamyl)propane |
| diphenylethylene and | 2,4-dianilino-s-triazine; |

(e) nuclear substituted derivatives of the above, for example, containing COOH, methyl, nitro and/or sulphonic acid and/or chlorine atoms as substituents in the phenyl or naphthalene nuclei.

Alternatively the group $NR^2LNR^3$ can be piperazino in which the two ring nitrogen atoms are bonded to the groups represented by X.

It is to be understood that the present invention relates not only to compounds of Formula (1) but also to the salts thereof, particularly the salt with an alkali metal, ammonia or substituted amines, especially ammonia and substituted amines which are volatile at room temperature. It is also to be understood that whilst Formulae (3) and (4) above are represented in neutral form, the present invention also covers quaternary salts of Formulae (3) and (4), particularly when the compound of Formula (1) is in zwitterionic form.

According to a further aspect of the present invention there is provided a process for the preparation of compounds of Formula (1) comprising (i) diazotisation of amines of the formulae $ArNH_2$ and $Ar^1NH_2$ with a diazotising agent such as $HNO_2$, in the cold and preferably below 5° C. to give the corresponding diazonium salts;

(ii) coupling the diazonium salt formed from $ArNH_2$ with an amine of formula H—J—$NR^1H$, and coupling the diazonium salt formed from $Ar^1NH_2$ with an amine of formula H—$J^1$—$NR^4H$ to give monoazo amines;

(iii) reacting the monoazo amines of step (ii) in either order or simultaneously with a compound of formula Cl—X—($NR^2$—L—$NR^3$—X)—Cl, preferably in the presence of base; wherein Ar, $Ar^1$, X, $R^1$ to $R^4$, J, $J^1$, L and n are as defined above unless stated otherwise.

Alternatively, step (iii) may be followed except that in the definition of X above, instead of the substituent Z there is Cl, and the product of step (iii) is reacted with a compound of formula ZH (wherein Z is as hereinbefore defined) to give a compound of Formula (1).

As Examples of amines of formulae $ArNH_2$ and $Ar^1NH_2$ which may be used in the preparation of compounds of Formula (1), there may be mentioned

| | |
|---|---|
| 2-aminoisophthalic acid | 3-amino-4-fluorobenzoic acid |
| 4-aminoisophthalic acid | 3-amino-5-hydroxybenzoic acid |
| 5-aminoisophthalic acid | 3-amino-4-hydroxybenzoic acid |
| 3-aminophthalic acid | 3-amino-2-hydroxybenzoic acid |
| 4-aminophthalic acid | 2-amino-6-hydroxybenzoic acid |
| 2-aminoterephthalic acid | 2-amino-4-nirobenzoic acid |
| 3-aminobenzoic acid | 3-amino-5-nitrobenzoic acid |
| 4-aminobenzoic acid | 2-nitro-3-aminobenzoic acid |
| anthranilic acid | 2-nitro-5-aminobenzoic acid |
| 4-sulphoanthranilic acid | 3-nitro-4-aminobenzoic acid |
| 5-sulphoanthranilic acid | 3-acetylamino-5-aminobenzoic acid |
| 2-amino-4-chlorobenzoic acid | 3-amino-4-methylbenzoic acid |
| 2-amino-5-chlorobenzoic acid | 2-amino-3-methylbenzoic acid |
| 3-amino-4-chlorobenzoic acid | 3-amino-4-methoxybenzoic acid |
| 5-amino-2-chlorobenzoic acid | 3-amino-4-hydroxybenzoic acid |
| 2-amino-5-methylbenzoic acid | 4-aminosalicylic acid |
| 2-amino-6-methylbenzoic acid | 5-aminosalicylic acid |
| 2-amino-5-bromobenzoic acid | 3-amino-2-naphthoic acid |
| 2-n-butoxy-4-aminobenzoic acid | 5-amino-2-naphthoic acid |

8-amino-2-naphthoic acid

The compounds of Formula (1) are especially useful for the preparation of inks, especially aqueous inks, used in ink jet printing and particularly thermal ink jet printing. The inks can be prepared according to known formulations.

The invention is further illustrated by the following Examples in which all parts and percentages are by weight unless otherwise indicated.

EXAMPLE 1

Preparation of

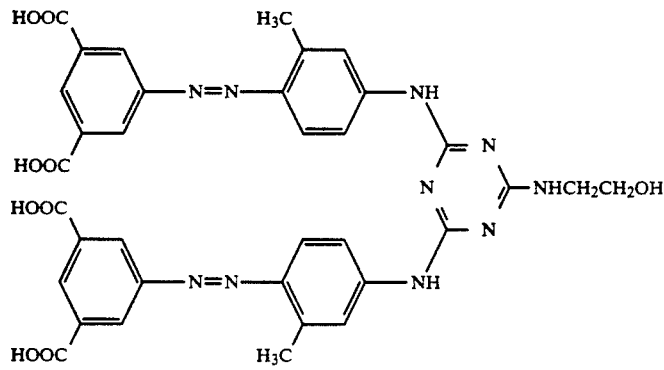

5-aminoisophthalic acid (36.2g) was stirred in water (1 liter) and the pH adjusted to 8-9 by addition of 2 N sodium hydroxide. Sodium nitrite (14 g) was added and the solution added to a mixture of concentrated hydrochloric acid (60 ml) and water (500 ml) at 0°-10° C. After 1 hour at 0°-10° C. the excess nitrous acid was removed by addition of a little sulphamic acid, to give a diazo suspension.

m-toluidine (21.4 g) was added to water (500 ml) and concentrated hydrochloric acid (25 ml) added. The solution was added over ½ hour to the above diazo suspension at 0°-10° C. The pH was adjusted to 4.0 by addition of 47% sodium hydroxide solution and the mixture stirred for 18 hours at 0°-10° C. The pH was adjusted to 8.0 with 47% sodium hydroxide solution, screened and then warmed to 60° C. It was slowly acidified to pH 4.0 with concentrated hydrochloric acid and the product filtered, washed with water and dried to give a monoazo compound.

8.87 g (one equivalent) of the above monoazo compound was added to water (500 ml) and the pH adjusted to 8.0 by addition of 47% sodium hydroxide solution. It was cooled to 0°-10° C. and a solution of cyanuric chloride (4.61 g, one equivalent) in acetone (50 ml) added maintaining the pH at 7-8 and a temperature of 0°-10° C. After ½ hour a further solution of one equivalent of the above monoazo compound (8.87 g) in water (500 ml) at pH 8.0 was added and the reaction mixture warmed to 45° C. and stirred at this temperature for 4 hours maintaining the pH at 7-8.

2-Aminoethanol (10 g) was then added and the mixture heated to 80° C. After stirring at 80° C. for 2 hours the pH was adjusted to 7.0 and salted to 20% using sodium chloride. The product was filtered and washed with saturated brine.

The above product was dissolved in water (1 liter) and the solution added to 2 N hydrochloric acid to precipitate the title product in free acid form. The title product was filtered, washed and added to water (200 ml). The pH was adjusted to 9.0 with concentrated ammonium hydroxide and the solution dialysed to remove chloride ions, screened and evaporated to give the ammonium salts of the title product. Yield=10 g.

When made into an ink by dissolving in water/diethylene glycol (92.5/7.5) and printed onto plain paper using a thermal ink-jet printing machine the ammonium salt of the title compound gave bright yellow shades with excellent water fastness and good light fastness. The same water/diethylene glycol mixture was used as the solvent in the inks described in subsequent Examples.

EXAMPLE 2

Preparation of the compound of Formula (8) in which W is H

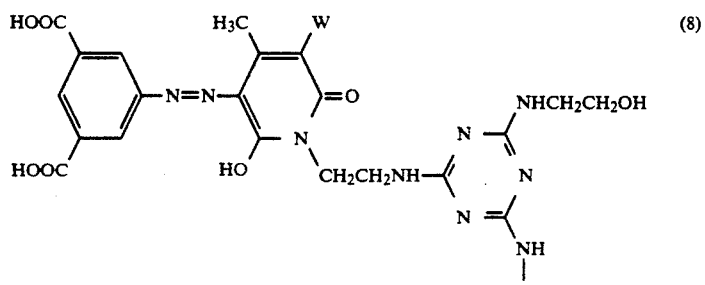

-continued

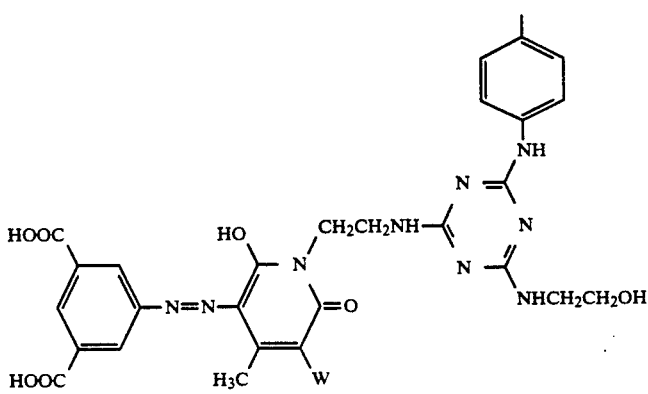

5-aminoisophthalic acid (9.05 g) was stirred in water (150 ml) and the pH adjusted to 8-9 by addition of 2 N sodium hydroxide solution. 2 N Sodium nitrite (25 ml) was added and the solution added to a mixture of concentrated hydrochloric acid (25 ml) and water (200 ml) at 0-5 C. After 2 hours the excess nitrous acid was removed by addition of a little sulphamic acid, to give a a solution of diazonium salt.

A mixture of 1-(2-aminoethyl)-6-hydroxy-4-methyl-pyrid-2-one (8.4 g), water (300 ml), sodium acetate (12.5 g) and 2 N sodium hydroxide (40 ml) was stirred at 0°-5° C. and the above solution of diazonium salt added at 0°-5° C. The mixture was stirred for 18 hours at 0°-5° C. It was filtered, washed with water and dried to give 20.5 g of azo pyridone compound.

18.09 of the above azo pyridone compound was stirred in water (300 ml) and cooled to 0°-5° C. A solution of cyanuric chloride (10 g, one equivalent) in acetone (100 ml) was added at 0°-5° C. maintaining the pH at 7-8 by addition of 2 N sodium hydroxide. After 3 hours the temperature was raised to 20°-25° C. and a solution of 1,4-phenylenediamine (2.16 g, ½ equivalent) in acetone (25 ml) added, maintaining the pH at 7-8. The mixture was stirred for 18 hours at 20°-25° C. maintaining the pH at 7-8.

The mixture was then acidified to pH 5 with concentrated hydrochloric acid, filtered, washed and dried to give 24.6 g of a bis(monochlorotriazine) intermediate compound.

11.46 g of the bis(monochlorotriazine) intermediate compound was stirred in water (150 ml) and 2-aminoethanol (9.2 g) added. The mixture was heated to 65° C. and stirred at 65°-70° C. for 12 hours. It was then acidified to pH 5, sodium chloride (30 g) added, and the product filtered off.

The product was then added to water (150 ml) and the pH adjusted to 9.0 with sodium hydroxide solution. The solution was added to a mixture of concentrated hydrochloric acid (20 ml) and water (200 ml) to precipitate the title compound in free acid form.

The title compound was filtered off and converted to the ammonium salt by adding to water (250 ml) and adjusting the pH to 9.0 by addition of concentrated ammonium hydroxide.

The solution was dialysed to remove chloride ions, screened and evaporated to give the ammonium salt of the title compound. Yield = 8.0 g.

When made into an ink and printed onto plain paper using a thermal ink-jet printing machine the ammonium salt of the title compound gave bright yellow shades with excellent water fastness and good light fastness.

EXAMPLE 3

Preparation of the compound of Formula (8) in which W is CN

In place of the 8.4 g of 1-(2-aminoethyl)-6-hydroxy-4-methyl-pyrid-2-one used in Example 2 there was used 8.95 g of 1-(2-aminoethyl)-3-cyano-6-hydroxy-4-methylpyrid-2-one. The ammonium salt of the title compound when made into an ink and printed onto plain paper using a thermal ink-jet printing machine gave yellow shades having excellent water fastness.

EXAMPLE 4

Preparation of the compound of Formula (8) in which W is $CONH_2$

In place of the 8.4 g of 1-(2-aminoethyl)-6-hydroxy-4-methyl-pyrid-2-one used in Example 2 there was used 10.55 g of 10(2-aminoethyl)-3-carbonamido-6-hydroxy-4-methylpyrid-2-one. The ammonium salt of the title compound when made into an ink and printed onto plain paper using thermal ink-jet printing machine gave yellow shades having excellent water fastness.

EXAMPLE 5

Preparation of the compound of Formula (9) in which X is $N(C_2H_4OH)_2$ and Y is $CH_3$

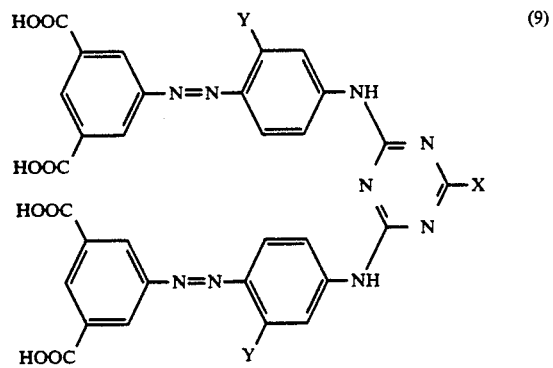

(9)

In place of the 10 g of 2-aminoethanol used in Example 1 there was used 17.29 of diethanolamine. The ammonium salt of the title compound when made into an ink and printed onto plain paper using a thermal ink-jet printing machine gave yellow shades having excellent water fastness.

EXAMPLE 6

Preparation of the compound of Formula (9) in which X is morpholino and Y is CH₃

In place of the 10 g of 2-aminoethanol used in Example 1 there was used 14.3 g of morpholine. The ammonium salt of the title compound when made into an ink and printed onto plain paper using a thermal ink-jet printing machine gave yellow shades having excellent water fastness.

EXAMPLE 7

Preparation of the compound of Formula (9) in which X is OH and Y is CH₃

In place of the 10 g of 2-aminoethanol used in Example 1 there was used 6.5 g of sodium hydroxide. The ammonium salt of the title compound when made into an ink and printed onto plain paper using a thermal ink-jet printing machine gave yellow shades having excellent water fastness.

EXAMPLE 8

Preparation of the compound of Formula (9) in which X is NHCH₂CH₂OH and Y is H

5-Aminoisophthalic acid (36.2 g) was diazotised as in Example 1.

Aniline ω-methane sulphonate (70 g) was added to water (400 ml) to dissolve. The solution was added to the above diazo suspension at 0°-10° C. and pH 7. The mixture was then stirred for 18 hours at 20° C.

The product was salted to 20% using sodium chloride, stirred for 2 hours, acidified to pH 4 with concentrated hydrochloric acid and then filtered.

The paste was added to a mixture of water (2 l) and sodium hydroxide (80 g) and heated at 70°-80° C. for 3 hours. It was cooled to 20° C. and salted to 20% using sodium chloride and acidified to pH 3 using concentrated hydrochloric acid. The product was filtered and dried to give the monoazo compound.

7.62 g (one equivalent) of the above monoazo compound was added to water (500 ml) and the pH adjusted to 8 by addition of 2 N sodium hydroxide solution. It was cooled tro 0°-10° C. and a solution of cyanuric chloride (50 g; one equivalent) in acetone (50 ml) added maintaining the pH at 7 and a temperature of 0°-10° C. After 1 hour a further solution of one equivalent of the above monoazo compound (7.62 g) in water (500 ml) at pH 8.0 was added and the reaction mixture warmed to 30° C. and stirred for 18 hours at 25°-30° C. The pH was adjusted to 5.0 with concentrated hydrochloric acid and the product filtered.

It was slurried in water (500 ml) and 2-aminoethanol (10 g) added and the mixture heated to 80° C. After stirring at 80° C. for 4 hours the product was salted to 30% with ammonium chloride and the mixture cooled to 20° C. The product was filtered and washed with saturated ammonium chloride solution.

The above product was dissolved in water (400 ml) by addition of concentrated ammonium hydroxide solution and added to a mixture of water (200 g) and concentrated hydrochloric acid (30 g) to precipitate the title compound in free acid form. It was filtered, washed and added to water (200 ml). The pH was adjusted to 9.0 with concentrated ammonium hydroxide solution and the solution dialysed to remove chloride ions, screened and evaporated.

The ammonium salt of the title compound when made into an ink and printed onto plain paper using a thermal ink jet printing machine gave bright yellow shades with very good water fastness.

EXAMPLE 9

Preparation of the compound of Formula (9) in which X is N(C₂H₄OH)₂ and Y is H

In place of the 10 g of 2-aminoethanol used in Example 8 there was used 15.75 g of diethanolamine. The ammonium salt of the title compound when made into an ink and printed onto plain paper using a thermal ink-jet printing machine gave bright yellow shades with very good water fastness.

EXAMPLE 10

Preparation of the compound of Formula (9) in which X is morpholino and Y is H

In place of the 10 g of 2-aminoethanol used in Example 8 there was used 14.3 g of morpholine. The ammonium salt of the title compound when made into an ink and printed onto plain paper using a thermal ink-jet printing machine gave bright yellow shades with very good water fastness.

EXAMPLE 11

Preparation of the compound of Formula (10) in which W is H and X is NHCH₂CH₂OH

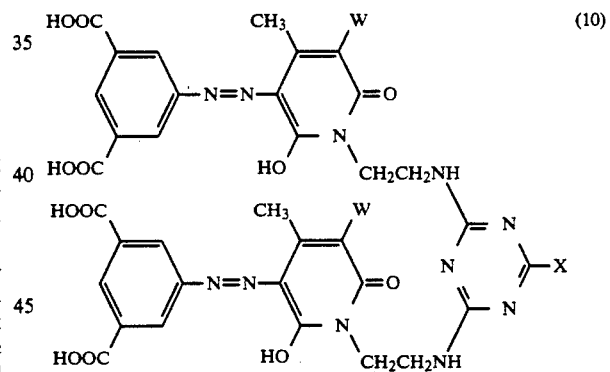

5-Aminoisophthalic acid was diazotised and coupled onto 1-(2-aminoethyl)-6-hydroxy-4-methylpyrid-2-one as in Example 2. It was then condensed with one equivalent of cyanuric chloride as in Example 2. A further equivalent of monoazo compound was then added, the temperature raised to 45° C. and the pH maintained at 7-8 for 4 hours.

2-Aminoethanol (5 g) was then added and the mixture heated at 65°-70° C. for 6 hours.

The reaction mixture was cooled to 20° C. and the pH adjusted to with concentrated hydrochloric acid. The product was filtered and reslurried in water (150 ml) and the pH adjusted to 9.0 with sodium hydroxide solution. The solution was added to a mixture of water (200 ml) and concentrated hydrochloric acid (20 ml) to precipitate the title compound in free acid form.

It was filtered off and converted to the ammonium salt by adding to water (250 ml) and adjusting the pH to 9.0 by addition of ammonium hydroxide.

The solution was dialysed to remove chloride ions, screened and evaporated.

When made into an ink and printed onto plain paper using a thermal ink jet printing machine it gave bright yellow shades with excellent water fastness.

EXAMPLE 12

Preparation of the compound of Formula (9) in which X is $N(CH_3)C_2H_4OH$ and Y is H In place of the 10 g of 2-aminoethanol used in Example 8 there are used 12.3 g of 2-(methylamino)ethanol. The ammonium salt of the title compound when made into an ink and printed onto plain paper using a thermal ink-jet printing machine gives bright yellow shades with very good water fastness.

EXAMPLE 13

Preparation of the compound of Formula (9) in which X is $N(C_2H_5)C_2H_4OH$ and Y is H In place of the 10 g of 2-aminoethanol used in Example 8 there are used 14.6 g of 2-(ethylamino)ethanol. The ammonium salt of the title compound when made into an ink and printed onto plain paper using a thermal ink-jet printing machine gives bright yellow shades with very good water fastness.

EXAMPLE 14

Preparation of the compound of Formula (9) in which X is $NH.nC_4H_9$ and Y is H In place of the 10 g of 2-aminoethanol used in Example 8 there was used 12 g of n-butylamine. The ammonium salt of the title compound when made into an ink and printed onto plain paper using a thermal ink-jet printing machine gave bright yellow shades with very good water fastness.

EXAMPLE 15

Preparation of the compound of Formula (9) in which X is $NH-nC_6H_{13}$ and Y is H In place of the 10 g of 2-aminoethanol used in Example 8 there s used 16.6 g of n-hexylamine. The ammonium salt of the title compound when made into an ink and printed onto plain paper using a ink-jet printing machine gave bright yellow shades with very good water fastness.

EXAMPLE 16

Preparation of the compound of Formula (9) in which X is $NH(CH_2)_6OH$ and Y is H In place of the 10 g of 2-aminoethanol used in Example 8 there was used 19.2 g of 6-amino-1-hexanol. The ammonium salt of the title compound when made into an ink and printed onto plain paper using a thermal ink-jet printing machine gave bright yellow shades with very good water fastness.

EXAMPLE 17

Preparation of the compound of Formula (11) in which X is $NHCH_2CH_2OH$ and Y is $OCH_3$

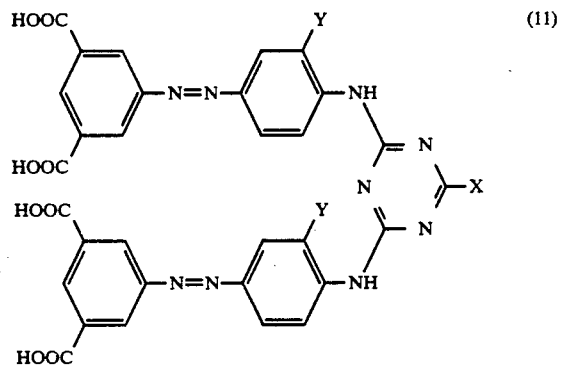

In place of the 70 g of aniline-ω-methane sulphonate used in Example 8 there was used 81.2 g of o-anisidine-ω-methane sulphonate. The ammonium salt of the title compound when made into an ink and printed onto plain paper using a thermal ink-jet printing machine gave bright yellow shades with very good water fastness.

EXAMPLE 18

Preparation of the compound of Formula (11) in which X is morpholino and Y is $OCH_3$ In place of the 10 g of 2-aminoethanol used in Example 17 there was used 14.3 g of morpholine. The ammonium salt of the title compound when made into an ink and printed onto plain paper using a thermal ink-jet printing machine gave bright yellow shades with good water fastness.

EXAMPLE 19

Preparation of the compound of Formula (12) in which X is $NHCH_2CH_2OH$, Y is $CH_3$ and Z is H

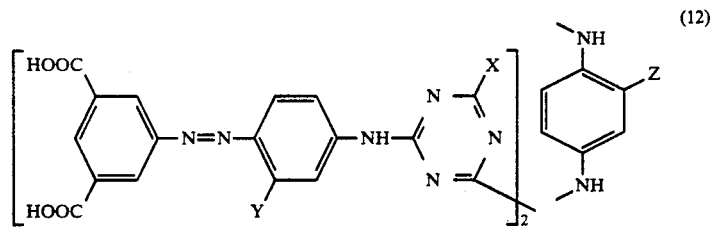

The monoazo compound made by coupling diazotised 5-aminoisophthalic acid with m-toluidine was prepared as in Example 1. 22.4 g of this monoazo compound was added to water (450 ml) and the pH adjusted to 8.0 by addition of 47% sodium hydroxide solution. It was cooled to 0°–10° C. and a solution of cyanuric chloride (15 g) in acetone (150 ml) added maintaining the pH at 7–8 and a temperature of 0°–10° C. After 3 hours a solution of p-phenylenediamine (3.24 g) in acetone (30 ml) was and the reaction mixture stirred at 25° C. and pH 7–8 for 18 hours. The reaction mixture was acidified to pH 5 with 2 N hydrochloric acid and the product filtered off and pulled dry.

It was added to water (750 ml) and 2-aminoethanol (27.6 g) added. The temperature was raised to 65° C.

and stirred at 65°-75° C. for 6 hours. After cooling to 20° C. the reaction mixture was acidified to pH 5 with concentrated hydrochloric acid and the title product filtered off. It was added to water (400 ml) and the pH adjusted to 9.0 with concentrated ammonium hydroxide and the solution dialysed to remove chloride ions, screened and evaporated. The ammonium salt when made into an ink and printed onto plain paper using a thermal ink jet printer gave bright yellow shades with excellent water fastness.

EXAMPLE 20

Preparation of the compound of Formula (12) in which X is $N(C_2H_4OH)_2$, Y is $CH_3$ and Z is H In place of the 27.6 g of 2-aminoethanol used in Example 19 there was used 47.5 g of diethanolamine. The ammonium salt of the title thermal ink-jet printing machine gave bright yellow shades with excellent water fastness.

EXAMPLE 21

Preparation of the compound of Formula (12) in which X is morpholino, Y is $CH_3$ and Z is H In place of the 27.6 g of 2-aminoethanol used in Example 19 there was used 39.4 g of morpholine. The ammonium salt of the title compound when made into an ink and printed onto plain paper using a thermal ink-jet printing machine gave bright yellow shades with excellent water fastness.

EXAMPLE 22

Preparation of the compound of Formula (12) in which X is $NHCH_2CH_2OH$, and Y and Z are H In place of the 22.4 g of the monoazo compound used in Example 19 there was used 21.4 g of the monoazo compound made by coupling diazotised 5-aminoisophthalic acid with aniline-ω-methane sulphonate followed by removal of the ω-methane sulphonate group as prepared in Example 8. When made into an ink and printed onto plain paper using a thermal ink-jet printing machine it gave bright yellow shades with very good water fastness.

EXAMPLE 23

Preparation of the compound of Formula (12) in which X is $N(C_2H_4OH)_2$, and Y and Z are H In place of the 27.6 g of 2-aminoethanol used in Example 22 there was used 47.5 g of diethanolamine. The ammonium salt of the title machine it gave bright yellow shades having good water fastness.

EXAMPLE 24

Preparation of the compound of Formula (13) in which X is H, Y is $NHCH_2CH_2OH$, and Z is $CH_3$

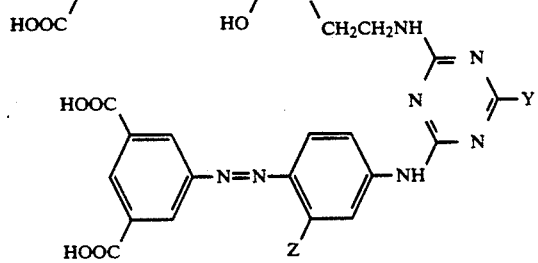

10.8 g of the monoazo dye made by coupling diazotised 5-aminoisophthalic acid with 1-(2-aminoethyl)-6-hydroxy-4-methylpyrid-2-one prepared as in Example 2 was stirred in water (1 l) and the pH adjusted to 8.0. It was cooled to 0°-5° C. and a solution of cyanuric chloride (5.5 g) in acetone (100 ml) was added at 0°-5° C. maintaining the pH at 7-8 by addition of 2 N sodium hydroxide. After 3 hours, 9 g of the monoazo dye made by coupling 5-aminoisophthalic acid with m-toluidine prepared as in Example 1 was added and the mixture warmed to 40°-45° C. It was stirred at this temperature, maintaining the pH at 7 for 4 hours. Ethanolamine (20 g) was then added, the temperature raised to 80° C. and stirred at this temperature for 2 hours. After cooling to 20° C. it was acidified to pH 5 with concentrated hydrochloric acid and the product filtered off and padded dry. it was added to water (400 ml) and the pH adjusted to 9 by addition of concentrated ammonium hydroxide. The solution was dialysed to remove chloride ions, screened and evaporated to give the ammonium salt of the title product. When made into an ink and printed onto plain paper using a thermal ink jet printer it gave bright yellow shades with very good water fastness.

EXAMPLE 25

Preparation of the compound of Formula (14) in which X is morpholino

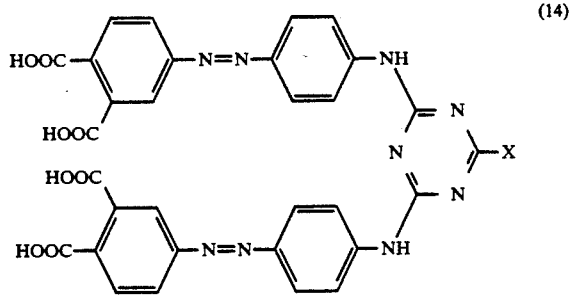

In place of the 5-aminoisophthalic acid used in Example 10 there is used an equal amount of 4-aminophthalic acid. The ammonium salt of the title compound when made into an ink and printed onto plain paper using a

EXAMPLE 26

Preparation of the compound of Formula (15) in which X is morpholino

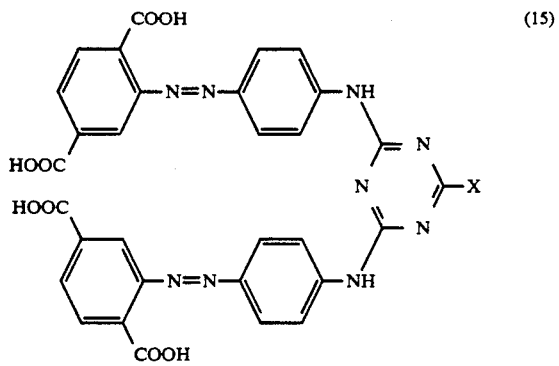

In place of the 5-aminoisophthalic acid used in Example 10 there is used an equal amount of 2-aminoterephthalic acid. The ammonium salt of the title compound when made into an ink and printed onto plain paper using a thermal ink-jet printing machine gives bright yellow shades having very good water fastness.

EXAMPLE 27

Preparation of the compound of Formula (16) in which X is morpholino

3-Aminobenzoic acid (13.79) is stirred in water (250 ml) and the pH adjusted to 8-9 by addition of sodium hydroxide solution. Sodium nitrite (6.9 g) is added and the solution added to a mixture of concentrated hydrochloric acid (20 ml) and water (100 ml) at 0°-10° C. After 1 hour at 0°-10° C., the excess nitrous acid is removed by addition of a little sulphamic acid.

Aniline ω-methane sulphonate (21 g) is added to water (150 ml) to dissolve. The solution is added to the above diazo solution at 0°-10° C. and pH 7. The mixture is stirred at 20° C. for 18 hours. The product is salted to 20% using sodium chloride, stirred 1 hour and acidified to pH 4 with concentrated hydrochloric acid and then filtered.

The paste is added to a mixture of water (700 ml) and sodium hydroxide (40 g) and heated at 70°-80° C. for 3 hours. It is cooled to 20° C. and salted to 20% using sodium chloride and acidified to pH 3 using concentrated hydrochloric acid. The product is filtered and dried to give the monoazo compound (A).

5-aminoisophthalic acid is diazotised and coupled onto aniline-ω-methane sulphonate as in Example 8. It is then heated with aqueous sodium hydroxide to remove the ω-methane sulphonate group as in Example 8 and 7.62 g (1 equivalent) of this product condensed with cyanuric chloride as described in Example 8. After 1 hour, 6.5 g (1 equivalent) of the above monoazo compound (A) in water (500 ml) is added. The pH is adjusted to 8 and the reaction mixture stirred at 25°-30° C. for 18 hours. The pH is adjusted to 5.0 with concentrated hydrochloric acid and the product filtered.

The product is added to water (500 g) and morpholine (14.3 g) added and the mixture warmed to 80° C. After stirring at 80° C. for 4 hours, the mixture is salted to 30% with ammonium chloride and then cooled to 20° C. and filtered.

The ammonium salt when made into an ink and printed onto plain paper using a thermal ink jet printer gives bright yellow shades with very good water fastness.

EXAMPLE 28

Preparation of the compound of Formula (17)

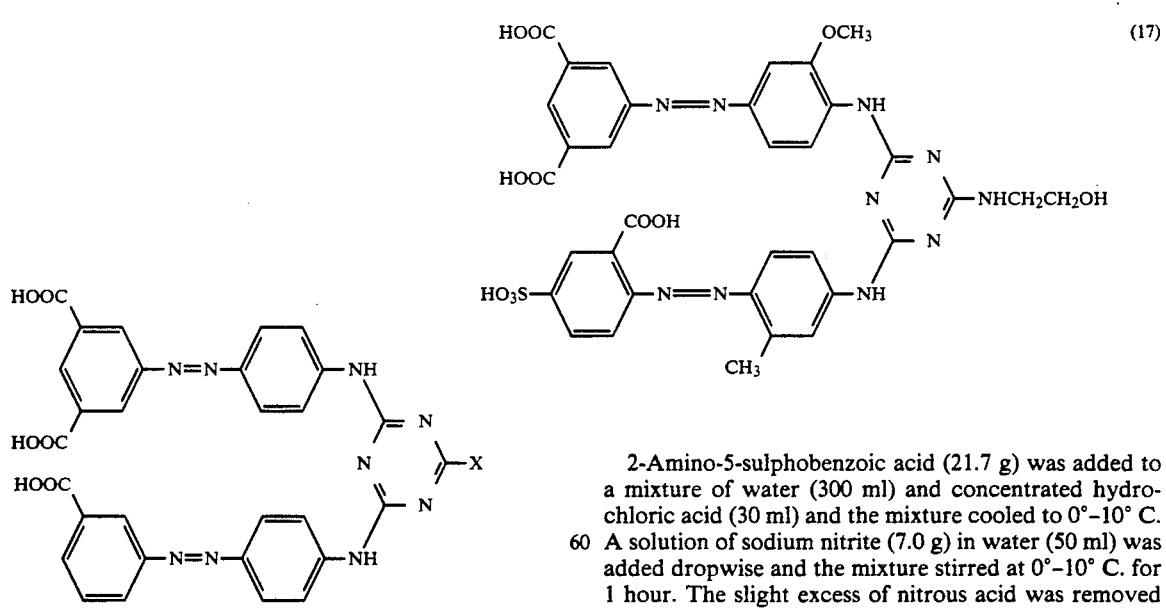

2-Amino-5-sulphobenzoic acid (21.7 g) was added to a mixture of water (300 ml) and concentrated hydrochloric acid (30 ml) and the mixture cooled to 0°-10° C. A solution of sodium nitrite (7.0 g) in water (50 ml) was added dropwise and the mixture stirred at 0°-10° C. for 1 hour. The slight excess of nitrous acid was removed with sulphamic acid and then the mixture added slowly to a solution of m-toluidine (10.7 g) in water (200 ml) and concentrated hydrochloric acid (12.5 ml) at 0°-10° C. The pH was adjusted to 4.0 and the mixture stirred for 18 hours at 0°-10° C. The monoazo compound was filtered off and dried.

6.3 g of the monoazo compound prepared from 5-aminoisophthalic acid and o-anisidine prepared as in Example 17 was added to water (500 ml) and the pH adjusted to 8.0 by addition of 47% sodium hydroxide solution. It was cooled to 0°-10° C. and a solution of cyanuric chloride (3.69 g) in acetone (50 ml) was added maintaining the pH at 7-8 and a temperature of 0°-10° C. After 30 minutes 6.7 g of the monoazo compound prepared above from 2-amino-5-sulphobenzoic acid and m-toluidine in water (500 ml) was added at pH 8.0 and the reaction mixture warmed to 40° C. and stirred at this temperature for 4 hours maintaining the pH at 2-Aminoethanol (8 g) was then added and the mixture heated to 80° C. After stirring at 80° C. for 4 hours the pH was adjusted to 7.0 and salted to 20% using sodium chloride. The product was filtered and washed with saturated brine.

It was converted to the ammonium salt as in Example 1, dialysed, screened and evaporated. When made into an ink and printed onto plain paper using a thermal ink jet printer it gave bright yellow shades with high water fastness.

EXAMPLE 29

Preparation of the compound of Formula (18)

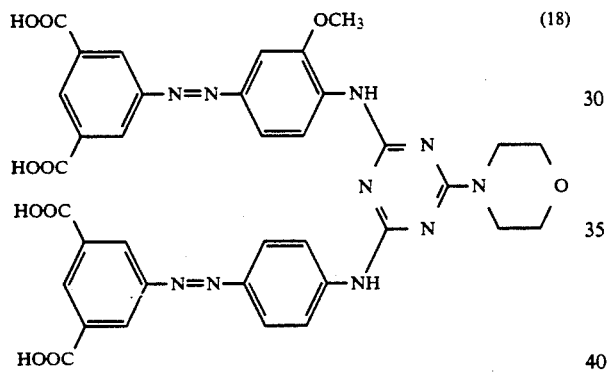

In place of the 6.7 g of the monoazo compound derived from 2-amino-5-sulphobenzoic acid and m-toluidine used in Example 28 there is used 5.7 g of the monoazo compound from 5-aminoisophthalic acid and aniline as prepared in Example 8 and in place of the 8 g of 2-aminoethanol there is used 11 g of morpholine. The ammonium salt of the title compound when made into an ink and printed onto plain paper using a thermal ink jet printing machine gives bright yellow shades with very good water fastness.

EXAMPLE 30

Preparation of the compound of Formula (12) in which X is morpholino, Y is H and Z are CO$_2$H In place of the 3.24 g of p-phenylenediamine used in Example 22 there is used 4.6 g of 2,5-diaminobenzoic acid and in place of the 27.6 g of 2-aminoethanol there is used 39.3 g of morpholine. The ammonium salt of the title compound when made into an ink and printed onto plain paper using a thermal ink-jet printing machine gives bright yellow shades having high water fastness.

EXAMPLE 31

In place of the 10 g of 2-aminoethanol used in Example 1 there is used 10 g of 4-(aminomethyl)benzoic acid. The product as the ammonium salt when made into an ink and printed onto plain paper using a thermal ink-jet printer gives bright yellow shades with excellent water fastness.

We claim:

1. An anionic azo compound which, in the free acid form, has the formula (1):

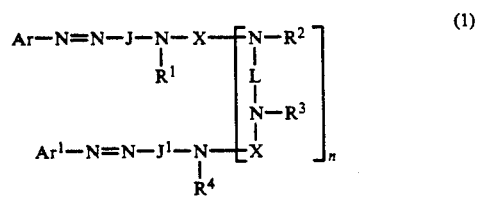

wherein:
Ar and Ar$^1$ are each independently aryl or substituted aryl providing at least one of Ar and Ar$^1$ has at least one substituent selected from COOH and COSH;

J and J$^1$ are each independently of formula (2), (3), or (4):

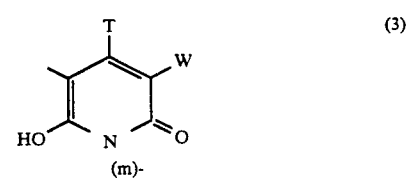

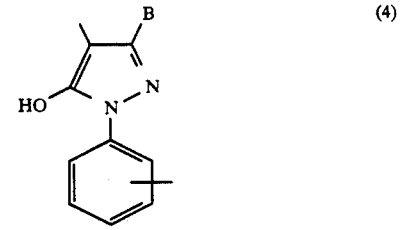

each R$^5$ is independently selected from H, alkyl, substituted alkyl, alkoxy, halogen, CN, ureido and NHCOR$^6$;

R$^6$ is H, alkyl, substituted alkyl, aryl, substituted aryl, aralkyl or substituted aralkyl;

each T is independently alkyl;

each W is independently selected from H, CN, CONR$^{10}$R$^{11}$, pyridinium and COOH;

each m is an alkylene chain having 2 to 8 carbon atoms;

B is H, alkyl or COOH;

R$^1$, R$^2$, R$^3$, R$^4$, R$^{10}$, and R$^{11}$, are each independently H, alkyl or substituted alkyl;

each L is a divalent organic linking group;

n is 0 or 1;

each X is independently carbonyl or a group of the Formula (5), (6) or (7):

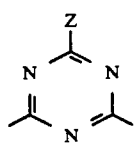 (5)

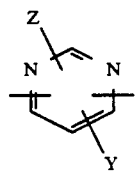 (6)

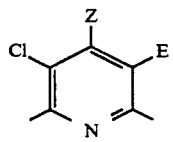 (7)

each Z is OR$^7$, SR$^7$ or NR$^8$R$^9$;
Y is H, Cl, CN or Z;
E is Cl or CN;
R$_7$, R$_8$, R$_9$ are independently H, alkenyl, substituted alkenyl, alkyl, substituted alkyl, aryl, substituted aryl, aralkyl or substituted aralkyl, or R$^8$ and R$^9$ together with the nitrogen atom to which they are attached form a 5 or 6 membered ring;
provided (i); the compound of Formula (1) has at least three and (ii) the compound of Formula (1) has at least as many —COOH groups as —SO$_3$H groups.

2. A compound according to claim 1 having at least as many —COOH as —SO$_3$H groups.

3. A compound according to claim 1 having no —SO$_3$H groups and at least two —COOH groups.

4. A compound according to claim 3 having at least three —COOH groups.

5. A compound according to any preceding claim wherein at least one of the Ar and Ar$^1$ has at least one —COOH substituent.

6. A compound according to claim 5 wherein each of Ar and Ar$^1$ has at least one —COOH substituent.

7. A compound according to claim 6 wherein each of Ar and and Ar$^1$ has at least two —COOH substituents.

8. A compound according to claim 7 wherein each of Ar and Ar$^1$ is dicarboxyphenyl.

9. A compound according to claim 1, 2, 3, or 4 wherein X is a group of Formula (5) and Z is selected from —NHC$_2$H$_4$OH, —N(C$_2$H$_4$OH)$_2$, —NH(C$_{1-6}$-alkyl) and morpholino.

10. An anionic azo compound which, in the free acid form, has the Formula (1):

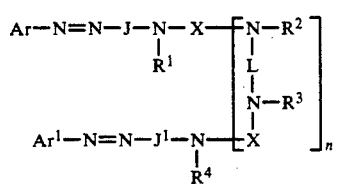 (1)

wherein:
Ar and Ar$^1$ are each independently aryl or substituted aryl providing at least one of Ar and Ar$^1$ has at least one substituent selected from COOH and COSH:

J and J$^1$ are each independently of formula (2), (3) or (4):

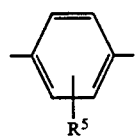 (2)

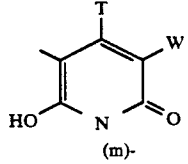 (3)

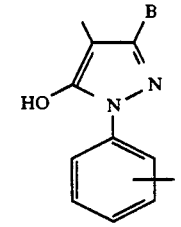 (4)

each R$^5$ is independently selected from H, alkyl, substituted alkyl, alkoxy, halogen, CN, ureido and NHCOR$^6$;
R$^6$ is H, alkyl, substituted alkyl, aryl, substituted aryl, aralkyl or substituted aralkyl;
each T is independently alkyl;
each W is independently selected from H, CN, CONR$^{10}$R$^{11}$, pyridinium and COOH;
each m is an alkylene chain having 2 to 8 carbon atoms;
B is H, alkyl or COOH;
R$^1$, R$^2$, R$^3$, R$^4$, R$^{10}$ and R$^{11}$ are each independently H, alkyl or substituted alkyl;
L is a divalent organic linking group;
n is 1;
each x is independently carbonyl or a group of the Formula (5), (6) or (7:

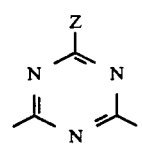 (5)

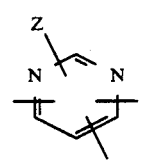 (6)

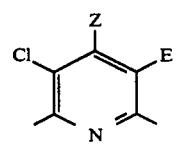 (7)

Z is OR$^7$, SR$^7$ or NR$^8$R$^9$;
Y is N, Cl, CN or Z;
E is Cl or CN;

$R^7$, $R^8$ and $R^9$ are independently H, alkenyl, substituted alkenyl, alkyl, substituted alkyl, phenyl, substituted phenyl, aralkyl or substituted aralkyl, or $R^8$ and $R^9$ together with the nitrogen atom to which they are attached form a 5 or 6 membered ring;

provided (i) if the compound of Formula (1) has no —SO$_3$H groups then it has at least two groups selected —COOH and —COSH; and (ii) the compound of Formula (I) has at least as many groups selected from —COOH and —COSH as —SO$_3$H groups.

11. A compound according to claim 10 wherein $R^8$ and $R^9$ are independently H, C$_{1-6}$-alkyl or substituted C$_{1-6}$-alkyl.

12. A compound according to claim 10 having at least three —COOH groups.

13. A compound according to claim 10 wherein each of Ar and Ar$^1$ has at least two —COOH substituents.

14. A compound according to claim 10 wherein X is a group of Formula (5) and Z is selected from —NHC$_2$H$_4$OH, —N(C$_2$H$_4$OH)$_2$, —NH(C$_{1-6}$-alkyl) and morpholino.

* * * * *

UNITED STATES PATENT AND TRADEMARK OFFICE
CERTIFICATE OF CORRECTION

PATENT NO. : 5,268,459
DATED : December 7, 1993
INVENTOR(S) : Gregory et al

It is certified that error appears in the above-indentified patent and that said Letters Patent is hereby corrected as shown below:

Column 19, line 37, claim 3, delete

"and at least two -COOH groups".

Signed and Sealed this

Eighteenth Day of July, 1995

Attest:

BRUCE LEHMAN

*Attesting Officer*     *Commissioner of Patents and Trademarks*

REEXAMINATION CERTIFICATE (2573rd)

United States Patent [19]
Gregory et al.

[11] B1 5,268,459
[45] Certificate Issued   May 9, 1995

[54] AZO DYES SUITABLE FOR INK JET PRINTING

[75] Inventors: Peter Gregory, Bolton; Ronald W. Kenyon, Failsworth, both of England

[73] Assignee: Zeneca Limited, London, England

Reexamination Request:
  No. 90/003,572, Sep. 16, 1994

Reexamination Certificate for:
  Patent No.: 5,268,459
  Issued:     Dec. 7, 1993
  Appl. No.:  723,323
  Filed:      Jun. 28, 1991

[30] Foreign Application Priority Data
  Jul. 26, 1990 [GB] United Kingdom ............ 9016448

[51] Int. Cl.⁶ .............. C09B 62/09; C09B 35/26; C09B 33/12; C09D 11/02
[52] U.S. Cl. .............. 534/758; 534/637; 534/664; 534/665; 534/670; 534/672; 534/673; 534/797; 534/817; 534/818; 106/22 K; 106/20 D

[56] References Cited

U.S. PATENT DOCUMENTS

| | | | |
|---|---|---|---|
| 1,594,828 | 8/1926 | Geller | 534/672 |
| 1,808,849 | 6/1931 | Heintrich et al. | 534/664 |
| 1,845,426 | 2/1932 | Latten | 534/665 X |
| 2,696,486 | 12/1954 | Gunst | 534/664 |
| 2,777,840 | 1/1957 | Liechti et al. | 534/672 |
| 3,945,990 | 3/1976 | Ikeda et al. | 534/797 |
| 4,474,696 | 10/1984 | Takahashi et al. | 534/634 |
| 4,605,442 | 8/1986 | Kawashita et al. | 534/797 X |
| 4,661,158 | 4/1987 | Kobayashi et al. | 534/797 X |
| 4,843,150 | 6/1989 | Hihara et al. | 534/634 |
| 4,977,919 | 3/1991 | Schaulin | 534/797 X |

FOREIGN PATENT DOCUMENTS

| | | | |
|---|---|---|---|
| 2555533 | 7/1976 | Germany | 534/797 |
| 57-102972 | 6/1982 | Japan | |

*Primary Examiner* — R. W. Ramsuer

[57] ABSTRACT

Anionic azo compounds which, in the free acid form, have the Formula (1):

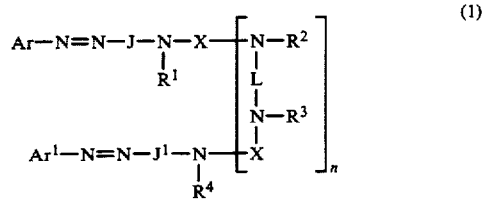

wherein:
  Ar and $Ar^1$ are each independently aryl or substituted aryl providing at least one of Ar and $Ar^1$ has at least one substituent selected from COOH and COSH;
  J and $J^1$ are each independently of formula (2), (3) or (4):

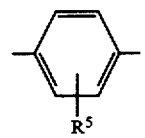

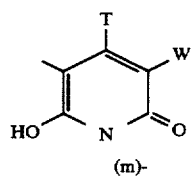

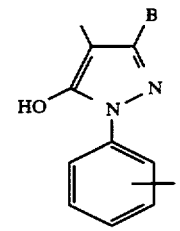

each $R^5$ is independently selected from H, alkyl, substituted alkyl, alkoxy, halogen, CN, ureido and $NHCOR^6$;
$R^6$ is H, alkyl, substituted alkyl, aryl, substituted aryl, aralkyl or substituted aralkyl;
each T is independently alkyl;

each W is independently selected from H, CN, CONR$^{10}$R$^{11}$, pyridinium and COOH;

each m is an alkylene chain having 2 to 8 carbon atoms;

B is H, alkyl or COOH;

R$^1$, R$^2$, R$^3$, R$^4$, R$^{10}$ and R$^{11}$ are each independently H, alkyl or substituted alkyl;

L is a divalent organic linking group;

n is 0 or 1;

each X is independently carbonyl or a group of the Formula (5), (6) or (7);

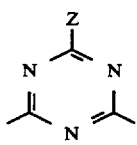
(5)

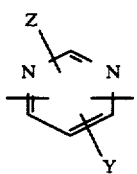
(6)

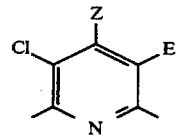
(7)

Z is OR$^7$, SR$^7$ or NR$^8$R$^9$;
Y is H, Cl, CN or Z;
E is Cl or CN;

R$^7$, R$^8$ and R$^9$ are independently H, alkenyl, substituted alkenyl, alkyl, substituted alkyl, aryl, substituted aryl, aralkyl or substituted aralkyl, or R$^8$ and R$^9$ together with the nitrogen atom to which they are attached form a 5 or 6 membered ring;

provided (i) if the compound of Formula 1 has no SO$_3$H groups then it has at least two groups selected from —COOH and —COSH; and (ii) the compound of Formula 1 has at least as many groups selected from —COOH and —COSH as —SO$_3$H groups.

The compounds are useful for the preparation of inks for use in ink-jet printing.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1 to 14 is confirmed.

* * * * *